INVENTOR.
Sidley O. Evans
BY
ATTORNEY

Patented June 12, 1951

2,557,046

UNITED STATES PATENT OFFICE 2,557,046

METHOD OF AND SYSTEM FOR OBTAINING ORIENTED CONTROL IMAGE OF WELD ZONE IN SEAM WELDING APPARATUS

Sidley O. Evans, Beaver Falls, Pa., assignor to The Babcock & Wilcox Tube Company, West Mayfield, Pa., a corporation of Pennsylvania Application May 3, 1949, Serial No. 91,086

6 Claims. (Cl. 219—6)

This invention relates to welding apparatus and, more particularly, to progressive seam welding apparatus including means for providing an operator with a magnified image of the welding zone and of the seam or cleft edges, whereby great accuracy of edge alignment may be effected and variations in the width and alignment of the welding cleft or seam readily detected.

In progressive or continuous seam welding, a pair of metallic edges to be weld united are progressively brought into juxtaposition as they approach a welding zone. In some instances the edges are actually forced together under pressure in the welding zone, as in pressure welding. In fusion welding, the edges may be abutted or may be slightly separated in entering the welding zone to form a welding groove or gap, and additional weld metal may or may not be supplied to form the joint. Alternatively the fused edges are forced together under pressure to form an upset along the welding seam. In all cases, it is important to the attainment of a sound welded joint that the edges be maintained in a predetermined relation as they enter the welding zone. Furthermore, accurate alignment of the edges in the welding zone is important.

The welding heat at the weld zone may be furnished in any suitable manner, such as by an electric current, as in resistance welding, or by a gaseous fuel burner, or by any type of arc welding. In the welding of the edges by a gaseous fuel burner or by an electric arc, the heat and glare problems involved substantially prevent any direct observation of the welding gap or seam cleft or of the edge alignment as the edges progressively enter the weld zone. This is particularly true in continuous tube forming operations wherein skelp lengths are progressively formed into the shape of a tube blank having a longitudinal gap or cleft, and passed between squeeze rolls which are set to bring the edges of the cleft into the required relation and alignment as the formed tubing enters the weld zone. The tube blank roll stands just in advance of the welding zone include a cleft or seam guide, which may be in the form of a circumferential rib on one or more upper rolls, or may be a fixed member. This guide is for the purpose of properly aligning the cleft with the welding instrumentality, such as the electric arc or a gas torch, (in fusion welding), by rotating the tube blank about its axis. Additionally these rolls are set to bring the cleft width to the desired optimum value as the tube blank enters the weld zone. The squeeze rolls and associated elements, as well as the tube blank itself, substantially prevent any view of the edges in the weld zone, looking downstream, even if the heat and glare of the welding heat source did not also substantially prevent such view.

In addition, many welding processes, particularly of the electric arc variety, involve the use of a gaseous medium, other than air, blanketing the weld zone. For example, hydrogen, helium, and other gases have been so used and advantageous results as respects the speed and quality of welding have been attained thereby. To protect the arm from air currents and to prevent contamination of the shielding gas by air, the welding head is surrounded with a suitable enclosing hood, and such hood further obstructs the operator's direct observation of the welding conditions.

Moreover, even if the aforementioned obstructions to direct visual observation of the weld zone were not present, it would still be a very difficult task to adjust the cleft width, the alignment of the cleft with the welding means, and the edge alignment by relying only on such direct observation. In ordinary seam welding with the weld members relatively stationary longitudinally of the seam, as well as in progressive or continuous seam welding, the cleft width and edge thickness are of such relatively small magnitude that it is difficult, if not impossible, to detect and correct for minor variations or deviations from the desired cleft width and alignment and the edge alignment.

In view of the foregoing, the present invention is directed to the provision of an oriented operating reference image of the weld zone, preferably magnified several times so that deviations in seam or cleft width and alignment and of edge alignment can be readily detected and corrected. To this end, the invention arrangement includes an optical system having an optical element in light receiving relation to the weld zone, whereby the element will receive an image of the weld zone, a screen arranged for direct visual observation by the operator of the welding apparatus, and optical means arranged to project the image from the element onto the screen. The source of light is the welding instrumentality, such as an electric arc or a gas flame, both of which have a high percentage of emitted rays within the visible spectrum. The optical means preferably is effective to provide a considerable magnification of the image, so that deviations in the cleft or seam width and alignment and of the edge alignment can be readily detected from the magnified image of such deviations on the screen, thus providing for ready correction of the weld zone geometry.

As specifically applied to a continuous tube welding apparatus having a tube blank forming roll stand immediately in advance of the welding zone, the invention system includes a mirror mounted between such stand and the weld zone, and adjustable both vertically and angularly about a horizontal axis. This mirror, which is preferably front-silvered to preclude double images, is in light receiving relation to the weld zone and receives an image of the "upstream" end of the weld through the open cleft in the tube blank as the latter enters the weld zone. At a substantial distance above this mirror, and in vertical alignment therewith, a second mirror is mounted and likewise is preferably front-silvered. Between the two mirrors, and having its axis aligned therewith, an adjustable magnifying lens unit is mounted. A relatively large screen is mounted "downstream" of the weld zone and substantially in the horizontal plane of the second or upper mirror.

The lens unit vertically inverts and horizontally reverses the light rays directed vertically from the lower mirror onto the upper mirror, and the latter directs the divergent rays horizontally toward the screen. The focal length and location of the lens unit are such that the image is brought into focus in the plane of the screen, and the lens unit preferably magnifies the image a substantial amount. Consequently, as the operator looks "downstream" of the tube welding apparatus, he can observe a magnified image of the "upstream" end of the weld zone. This image is properly oriented vertically, but is reversed horizontally. Optically, the arrangement provides the illusion of actually looking "downstream" at a mirror reflection of the "upstream" end of the weld zone. The substantial magnification of the image magnifies any deviations in the weld zone geometry, so that accurate correction can be readily effected. The horizontal reversal is initially slightly confusing, but an operator becomes accustomed thereto in a few minutes so that there is no disadvantage in using the horizontally reversed image as an operating reference. If desired, a compound lens system may be used to correct this horizontal inversion.

With the foregoing in mind, it is an object of the present invention to provide, for welding apparatus of the type including components obstructing direct visual observation of the weld zone, an optical system effective to provide an oriented operating reference image of the weld zone.

Another object is to provide such a system including means for magnifying the weld zone image.

A further object is to provide such a system which is simple in construction, has a minimum number of parts and is readily incorporated in existing welding apparatus without any substantial modification of the latter.

These and other objects, advantages and novel features of the invention will be apparent from the following description and accompanying drawings.

In the accompanying drawings, the invention is illustrated, by way of example, as incorporated in a continuous tube welding mill in which the skelp is progressively formed into a tube blank having a longitudinal cleft and the cleft edges progressively brought into a welding zone where the edges are weld united to complete the tube. Following the welding, the completed tubing passes, in the usual manner, through additional finishing rolls which straighten and size the tubing and bring it to the required peripheral contour.

More specifically, the illustrated apparatus effects welding by an electric arc under a blanket of an inert gas, such as helium. The arc is struck between a substantially non-fusible electrode of tungsten or the like, and a blanketing stream of helium is delivered to the welding zone. To confine the helium blanket at the welding zone, a hood is provided, and this hood offers a further obstruction to the operator's visual observation of the welding. Additionally, the rays of the arc in the helium are injurious to eyesight, with even instantaneous exposure of the eyes to the rays resulting in painful burning of the eyeballs requiring extensive medication. Consequently, the hood is either opaque or, if provided with observation openings, has windows made of material which intercepts substantially all the light rays due to the arc. Thus direct visual observation of the weld zone is further inhibited. However, with the invention optical system, an indirect but vertically oriented and preferably magnified image of the weld zone is continually provided for the operator.

Figure 1:
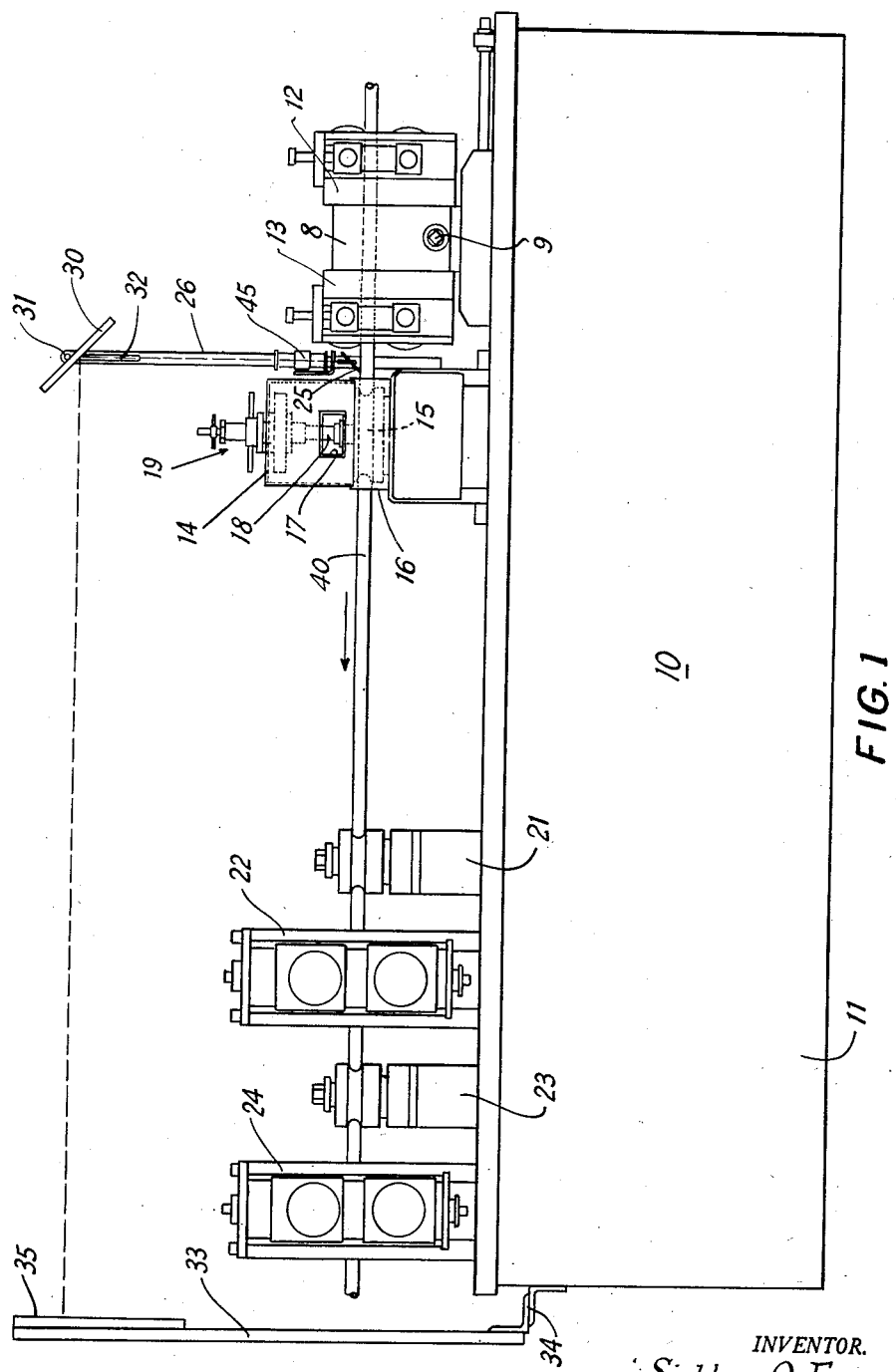
Fig. 1 is an elevation view of one side of a continuous tube welding apparatus incorporating the invention system.

Referring to Fig. 1, the tube welding apparatus 10 includes a frame 11 on which are mounted tube blank guiding roll stands 12, 13 of conventional construction. These stands receive the tube blank from preceding stands which progressively shape the flat skelp into an elongated tube blank having a longitudinally extending cleft. Stands 12 and 13 include a cleft guide (not shown) in the form of a circumferential rib engaging the cleft edges. To align the cleft with the welding electrode, these stands are mounted for angular adjustment, about the tube axis, in a bearing 8, such adjustment being effected by suitable means indicated at 9. The angular adjustment serves to rotate the tube blank about its axis to properly align the cleft with the welding electrode. The tube blank 40, as it is formed, passes to the left (Fig. 1) through the forming stands and then between squeeze rolls 15 which force the cleft edges together under pressure at the welding zone and just beyond the welding electrode 50.

The squeeze rolls 15 are located immediately downstream of stand 13, so that the latter prevents any view of the upstream end of the weld zone. The latter is enclosed in an opaque hood 14, which may be mounted for vertical movement and have a flexible blanket 16 of asbestos or the like on its lower edge to assure substantially gas-tight enclosure of the weld zone. Hood 14 may have suitable ray intercepting windows 17, if desired.

The welding apparatus, insofar as the arc producing parts thereof are concerned, is enclosed within hood 14. The apparatus may include a suitable combined nozzle and electrode guide 18 for positioning the tungsten or other non-consumable electrode in proper arcing relation to the edges to be weld united. In the instant case, nozzle 18 is arranged to direct an annular stream of an inert gas, such as helium, around the arc and in blanketing relation to the weld zone. The adjustment controls for the electrode position and the helium flow are generally indicated at 19 on top of hood 14.

In the welding zone, squeeze rolls 15 press the edges of the cleft into abutting relation, as these edges are fused by the heat of the arc, to close the tube blank cleft. Leaving the weld zone, tube 40 may be sprayed with a suitable coolant as it passes to successive sets of finishing roll stands indicated at 21, 22, 23 and 24. These stands "size" and straighten the tube, bringing the cross-sectional shape to the desired roundness and the external tube dimensions to the desired values. In addition, any bends along the tube are removed so that a straight length of tubing emerges from the finishing stands for passage to cuttting apparatus (not shown) which severs the continuous tubing into selected lengths. The arrangements so far described represent known apparatus and practice in the continuous tube welding art.

Referring to Fig. 1, it will be apparent that, due to the location of stand 13 immediately adjacent the weld seam, it is a practical impossibility for the machine operator to obtain an adequate view of the upstream end of the welding zone, even if the latter were not enclosed by hood 14. Were these restrictions removed, an adequate observation of the weld zone would still be substantially impossible due to the heat and glare of the arc, without the use of goggles, etc.

Such adequate and unobstructed observation, however, is a practical necessity, as the production of a good quality weld is vitally dependent upon maintaining the welding cleft width and alignment, the edge alignment, and the electrode-to-work spacing at predetermined values within very close limits. While the electrode spacing can be fairly well controlled automatically by arc voltage responsive mechanism, the other factors can be maintained at preset values only with great care and continuous manipulation. For example, the edge alignment and weld cleft width and alignment are controlled by adjustment of squeeze rolls 15, and these may be preset for a certain set of values. However, due to undulations in the tubing and other variable factors, the desired cleft values and edge alignment are not always maintained, and continuous adjustment of squeeze rolls 15 and of roll stands 12, 13 is rendered necessary. Moreover, with certain smaller tubing sizes, the relative dimensions involved are so small that even direct visual observations are insufficient as a determination of departures from the preset values. For example, in the manufacture of 1 in. diameter tubing, the wall thickness may be 0.049 in. and the cleft width as the tube blank enters the weld zone will be between 0.005 and 0.040 in. depending on the conditions desired.

The optical system of the present invention overcomes these several difficulties and provides an operator, standing adjacent controls 19 and looking toward finishing roll stands 21—24, with an oriented image of the upstream end of the welding zone. This image is greatly magnified so that deviations in the cleft width and alignment and in the edge alignment are readily apparent and can be accurately corrected or compensated.

Referring again to Fig. 1, a relatively small mirror 25 is mounted on the lower end of a frame 26 secured to frame 11 between stand 13 and hood 14. Mirror 25 is mounted, for angular adjustment about an axis perpendicular to the tube axis, on a horizontal rod which is vertically adjustable along slots in frame 26. Mirror 25 is so adjusted as to pick up light rays from the welding zone passing through and adjacent to the cleft in the tube blank as it leaves stand 13 to enter hood 14, and to direct these rays vertically to a second mirror 30. The latter is likewise both angularly and vertically adjustable on the upper section of frame 26 through the medium of a horizontal shaft 31 and slots 32 in the frame receiving the shaft.

Mirror 30 is considerably larger than mirror 25, for a reason described hereinafter, and both mirrors are preferably front silvered to avoid double images or refraction. The rays striking mirror 30 are reflected horizontally onto a screen 35 mounted on a frame 33 secured to brackets 34 on the left end (Fig. 1) of frame 11. Screen 35 may be a standard projection screen, such as used with movie or slide projectors, and is so located that the operator at hood 14 sees the image of the upstream end of the welding zone exactly as if he were looking downstream of the tube blank 40 from a point between stand 13 and hood 14.

As stated, a magnified image is projected onto screen 35 so that the operator may more readily detect deviations in cleft width and alignment and in edge alignment. For this purpose, an adjustable focus and magnification lens arrangement 45 is adjustably mounted on frame 26 between mirrors 25 and 30, so that the image received by mirror 25 is enlarged, inverted vertically, and reversed horizontally between mirrors 25 and 30. This assures proper orienting of the image on screen 35 as well as magnification thereof.

Figure 3:
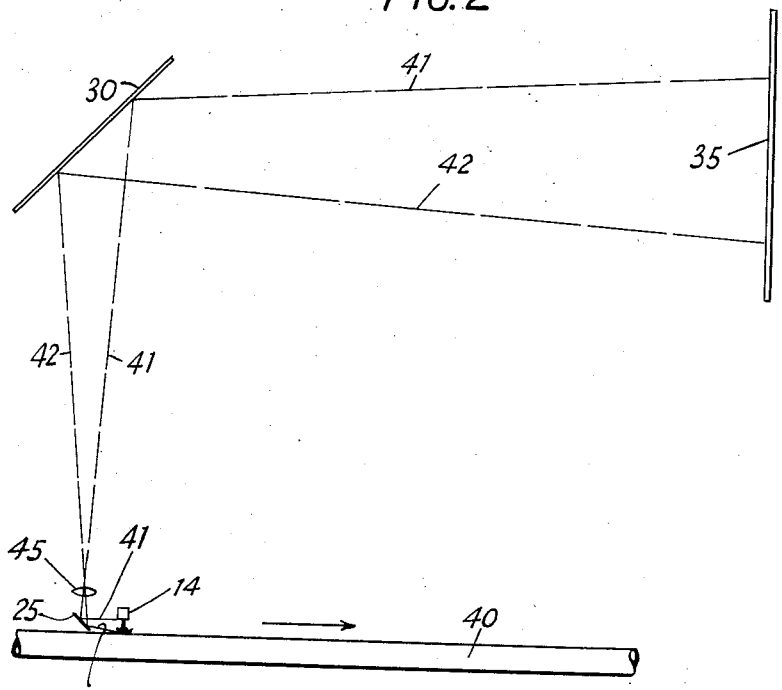
Fig. 3 is a schematic view illustrating the optical relationships involved, as seen from the side of the tube welding apparatus opposite to that shown in Fig. 1.

The optical relations involved will be clear from Fig. 3, which shows the optical system looking at the side of apparatus 10 opposite from that shown in Fig. 1. The light rays from the different parts of the weld zone reaching mirror 25 from beneath the edge of hood 14 and through the cleft in the tubing as it enters hood 14, are bounded by upper line 41 and lower line 42. If these rays were reflected by mirror 25 directly onto mirror 30 and by mirror 30 reflected onto screens 35, without the interposition of lens system 45, the image on screen 35 would be inverted and would be substantially the same size as that received by mirror 25 or possibly slightly enlarged. However, as seen in Fig. 3, lens system 45 inverts the image and magnifies it, so that line 41 is still the upper line and line 42 the lower line, as the rays strike screen 35.

Figure 2:
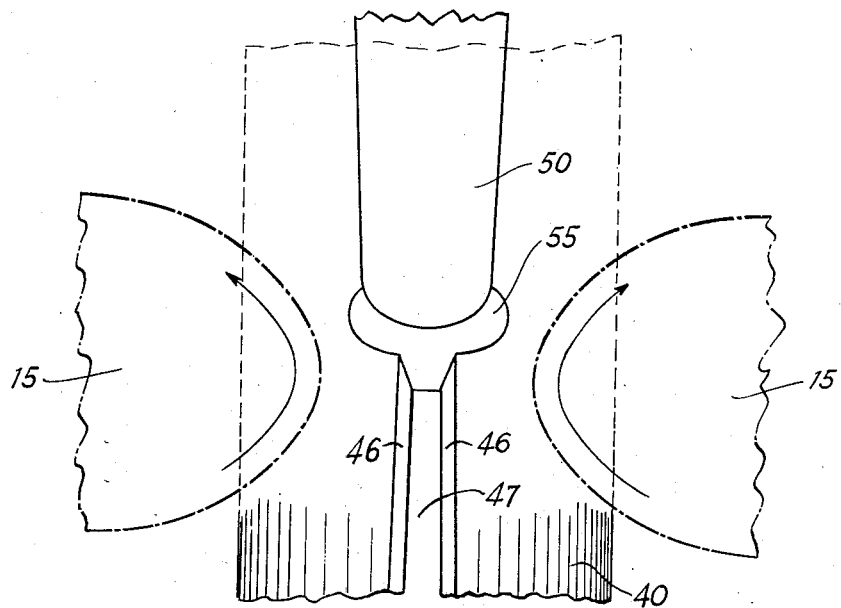
Fig. 2 is a front elevation view of the screen showing substantially how the welding zone image appears to an operator.

Fig. 2 shows the image of the upstream end of the weld zone as it appears on screen 35, and is traced from a reduced photograph of the image on the screen. Actually, the image is several times the size of that depicted in Fig. 2. Referring to Fig. 2, the squeeze rolls are shown at 15 as engaging tubing 40 to press the edges 46, 46 of cleft 47 into abutting relation as they pass beneath the arcing end of electrode 50. The arc is shown at 55 as it appears on screen 35. It will be noted that deviations from normal of the width and alignment of cleft 47 and of the alignment of edges 46, 46 can be readily detected and corrected, due to the greatly magnified image on screen 35. If desired, scales and guide lines may be provided on the screen for greater ease in detecting such deviations. Such correction is effected by changing the spacing of the rolls of stands 12, 13, by angularly adjusting these stands about the tube blank axis, and by adjusting rolls 15.

The described optical system has proven very effective in practice and has met with widespread response as solving a hitherto insoluble difficulty. It is simple, inexpensive, reliable and efficient.

While a specific embodiment of the invention has been shown and described in detail to illustrate the invention principles, it will be understood that the invention may be embodied otherwise without departing from such principles.

I claim:

1. In the tube forming and welding apparatus having a stand of tube forming rolls immediately upstream from the weld zone and obstructing direct visual observation of the upstream end of the weld zone, the weld zone including a source of rays in the visible spectrum, an optical system effective to provide an oriented operating reference image of the weld zone and comprising, in combination, an optical element between the weld zone and said stand and in light receiving relation to the upstream end of the weld zone, whereby an image of the upstream end of the weld zone will be received by said element; a screen arranged for direct visual observation by an operator of the apparatus; and optical means arranged to project the image from said element onto said screen.

2. In tube forming and welding apparatus having a stand of tube forming rolls immediately upstream from the weld zone and obstructing direct visual observation of the upstream end of the weld zone, the weld zone including a source of rays in the visible spectrum, an optical system effective to provide an oriented operating reference image of the weld zone and comprising, in combination, a mirror between the weld zone and said stand and in light receiving relation to the upstream end of the weld zone, whereby an image of the upstream end of the weld zone will be received by said mirror; a screen arranged for direct visual observation by an operator of the apparatus; and optical means, including a second mirror, arranged to project the image from said first-named mirror onto said screen.

3. In the tube forming and welding apparatus having a stand of tube forming rolls immediately upstream from the weld zone and obstructing direct visual observation of the upstream end of the weld zone, the weld zone including a source of rays in the visible spectrum, an optical system effective to provide an oriented operating reference image of the weld zone and comprising, in combination, a mirror between the weld zone and said stand and in light receiving relation to the upstream end of the weld zone, whereby an image of the upstream end of the weld zone will be received by said mirror; a screen arranged downstream of the weld zone for direct visual observation by an operator of the apparatus; and optical means, including a lens system, arranged to project the image from said mirror onto said screen.

4. In tube forming and welding apparatus having a stand of tube forming rolls immediately upstream from the weld zone and obstructing direct visual observation of the upstream end of the weld zone, the weld zone including a source of rays in the visible spectrum, an optical system effective to provide an oriented operating reference image of the weld zone and comprising, in combination, a first mirror between the weld zone and said stand and in light receiving relation to the upstream end of the weld zone, whereby an image of the upstream end of the weld zone will be received by said mirror; a screen arranged downstream of the weld zone for direct visual observation by an operator of the apparatus; and optical means, including a lens system and a second mirror, arranged to project the image from said element onto said screen.

5. In tube forming and welding apparatus having a stand of tube forming rolls immediately upstream from the weld zone and obstructing direct visual observation of the upstream end of the weld zone, the weld zone including a source of rays in the visible spectrum, an optical system effective to provide an oriented operating reference image of the weld zone and comprising, in combination, a first mirror between the weld zone and said stand and in light receiving relation to the upstream end of the weld zone, whereby an image of the upstream end of the weld zone will be received by said mirror; a screen arranged downstream of the weld zone for direct visual observation of the apparatus; and a lens system arranged to magnify the image from said mirror and direct the light rays onto a second mirror above the apparatus; said second mirror reflecting the light rays onto said screen.

6. In electric arc tube forming and welding apparatus of the type in which a pair of metallic edges, initially separated by a cleft, are progressively brought into juxtaposition and weld united in a weld zone, and including components obstructing direct visual observation of the weld zone during a welding apparatus, the method of controlling the cleft, width, cleft alignment and edge alignment which comprises using the arc as a light source to provide an image of the upstream end of the weld zone; orienting and magnifying such image; projecting the oriented and magnified image onto a screen arranged for direct observation by an operator; and utilizing such image as a reference in adjusting the apparatus components to control the cleft width, cleft alignment and edge alignment.

SIDLEY O. EVANS.

REFERENCES CITED

The following references are of record in the file of this patent:

UNITED STATES PATENTS

| Number | Name | Date |
| --- | --- | --- |
| 1,789,009 | Luce | Jan. 13, 1931 |
| 1,851,173 | Hall | Mar. 29, 1932 |
| 1,869,351 | Lincoln | July 26, 1932 |
| 2,192,529 | Thomas et al. | Mar. 5, 1940 |